(12) United States Patent
Magolan et al.

(10) Patent No.: US 11,192,548 B2
(45) Date of Patent: Dec. 7, 2021

(54) METHODS AND SYSTEMS FOR LIMITING A VEHICLE SPEED AND CHANGING VEHICLE DYNAMICS DRIVE MODE

(71) Applicant: Ford Global Technologies, LLC, Dearborn, MI (US)

(72) Inventors: Allen Magolan, Brighton, MI (US); Steve Skikun, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 16/363,368

(22) Filed: Mar. 25, 2019

(65) Prior Publication Data
US 2020/0307578 A1 Oct. 1, 2020

(51) Int. Cl.
*B60W 30/14* (2006.01)
*B60W 20/00* (2016.01)
(Continued)

(52) U.S. Cl.
CPC ........ *B60W 30/146* (2013.01); *B60W 10/184* (2013.01); *B60W 10/20* (2013.01); *B60W 10/22* (2013.01); *B60W 20/00* (2013.01); *G05D 1/0088* (2013.01); *B60W 2520/26* (2013.01); *B60W 2552/00* (2020.02); *B60W 2555/20* (2020.02); *B60W 2556/45* (2020.02);
(Continued)

(58) Field of Classification Search
CPC .. B60W 30/146; B60W 10/184; B60W 10/20; B60W 10/22; B60W 20/00; G05D 1/0088
See application file for complete search history.

(56) References Cited

U.S. PATENT DOCUMENTS 5,319,366 A * 6/1994 Mendeleev ............... B60T 1/10
180/170
5,665,026 A 9/1997 Linden
(Continued)

FOREIGN PATENT DOCUMENTS

| CN | 1173216 A | 2/1998 |
|---|---|---|
| CN | 2652705 Y | 11/2004 |
| JP | 2008265676 A | 11/2008 |

OTHER PUBLICATIONS

Dudar, A., "Methods and Systems for Cloud-Based Emissions Testing," U.S. Appl. No. 16/044,334, filed Jul. 24, 2018, 67 pages.

*Primary Examiner* — Anne Marie Antonucci
*Assistant Examiner* — Sahar Motazedi
(74) *Attorney, Agent, or Firm* — Geoffrey Brumbaugh; McCoy Russell LLP

(57) ABSTRACT

Methods and systems are provided for a vehicle speed limiter. In one example, a method may include decreasing a vehicle top speed in response to the vehicle being arranged in a geofenced area via the vehicle speed limiter. In at least one example, adjusting a magnitude of the vehicle top speed limiter to decrease a limiting of the vehicle top speed may be in response to an override request, where the override request is signaled via one or more of depression of a pedal of the vehicle in a pattern and a siren of the vehicle being activated. Further, in one or more examples, the vehicle may be the only vehicle of a plurality of vehicles comprising one or more of a solar cell and a wireless modem.

20 Claims, 7 Drawing Sheets

(51) Int. Cl.
*B60W 10/22* (2006.01)
*B60W 10/20* (2006.01)
*B60W 10/184* (2012.01)
*G05D 1/00* (2006.01)

(52) U.S. Cl.
CPC ...... *B60W 2720/10* (2013.01); *B60Y 2200/92* (2013.01); *G05D 2201/0213* (2013.01)

(56) References Cited

U.S. PATENT DOCUMENTS

| | | | |
|---|---|---|---|
| 6,010,277 A | | 1/2000 | Follman |
| 7,757,803 B2 | | 7/2010 | Fiske et al. |
| 10,053,088 B1 | * | 8/2018 | Askeland ............... B60N 2/002 |
| 10,410,516 B1 | * | 9/2019 | Andersson ........... G08G 1/0133 |
| 10,449,967 B1 | * | 10/2019 | Ferguson ................ H04L 67/12 |
| 2009/0093927 A1 | * | 4/2009 | Mueller-Schneiders ..................... B60R 16/0232 701/36 |
| 2010/0033315 A1 | * | 2/2010 | Kamen .................... B62H 5/20 340/441 |
| 2011/0050459 A1 | * | 3/2011 | Vasireddy ........ G08G 1/096791 340/905 |
| 2011/0238259 A1 | * | 9/2011 | Bai ....................... H04L 67/125 701/31.4 |
| 2014/0121933 A1 | * | 5/2014 | Slaton ................. B60W 50/085 701/93 |
| 2014/0244111 A1 | * | 8/2014 | Gross .................... B60W 50/14 701/36 |
| 2015/0203105 A1 | * | 7/2015 | Liang ...................... B60K 6/48 701/22 |
| 2016/0194002 A1 | * | 7/2016 | Kelly .................... B60W 50/14 701/22 |
| 2017/0263120 A1 | * | 9/2017 | Durie, Jr. ............. G08G 1/205 |
| 2018/0209795 A1 | * | 7/2018 | Okuyama .............. G01C 21/28 |
| 2018/0283895 A1 | * | 10/2018 | Aikin ................... G08G 1/0104 |
| 2018/0339706 A1 | * | 11/2018 | Biondo .................. G09B 19/16 |
| 2019/0003698 A1 | * | 1/2019 | Kimura .................. B60Q 1/085 |
| 2019/0384293 A1 | * | 12/2019 | Yoo ....................... B60W 40/06 |
| 2020/0089180 A1 | * | 3/2020 | Ekawa ............... G05B 19/0428 |
| 2020/0211373 A1 | * | 7/2020 | Ikemoto ............... G08G 1/0125 |

* cited by examiner

METHODS AND SYSTEMS FOR LIMITING A VEHICLE SPEED AND CHANGING VEHICLE DYNAMICS DRIVE MODE

FIELD

The present description relates generally to limiting a vehicle top speed and vehicle dynamics in response to ambient conditions as well as remote drive settings from command staff due to desired drive conditions.

BACKGROUND/SUMMARY

Top speeds and driving dynamics for transportation devices (e.g., vehicles) continue to increase as advancements are made with regard to lighter materials, increased power output, and increased downforce. These increased top speeds and driving dynamics parameters may be undesirable during some driving conditions. For example, many performance vehicles are tested during fixed conditions aimed at increasing a reliability of the vehicle as it is propelled at its top speed, where the fixed conditions may include dry road conditions, a relatively straight road path, and the like.

Many manufacturers are equipping transportation devices with a speed limiter. The speed limiter may decrease an unadulterated top speed of the transportation device during all operating conditions independent of ambient conditions. That is to say, the speed limiter may be active at all times, even if the fixed conditions described above are met. Other examples include options for an operator to override the speed limiter so that the operator may realize the unadulterated top speed of the transportation device.

However, the inventors have identified some issues with the approaches described above. For example, the operator may be unaware of various ambient conditions that may affect a drivability of the transportation device at higher speeds near the top, boundless speed. Additionally, with the incorporation of electric motors, sound proofing to dull engine sounds, and vibration and harshness decreasing as engines and suspension systems become more sophisticated, the operator may be unaware of a current speed traveled while focusing on a road or other matters and not on a speedometer. Thus, speed limiters where the operator may optionally override the speed limiter may be undesired.

The inventors have identified the above issues and come up with a way to at least partially solve them. In one example, the issues described above may be addressed by a method comprising adjusting a vehicle top speed limiter in response to a vehicle being arranged within a geofenced area to decrease a vehicle top speed. In this way, the vehicle top speed is decreased in response to a vehicle location and conditions corresponding thereto.

As one example, the geofenced area corresponds to an area comprising increased foot traffic, wherein the geofenced area may further comprise a threshold population density. Additionally or alternatively, the vehicle top speed and vehicle dynamics may be adjusted based on traction and visibility, along with a vehicle configuration (e.g., sensors, transmission, size, etc.). By doing this, a travelling experience of a vehicle operator and/or passengers onboard the vehicle may be adjusted to meet current conditions to provide a more desirable travelling experience. Decreasing the vehicle top speed and/or adjusting the vehicle dynamics features to a different mode may lead to increased comfort, handling, and stability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
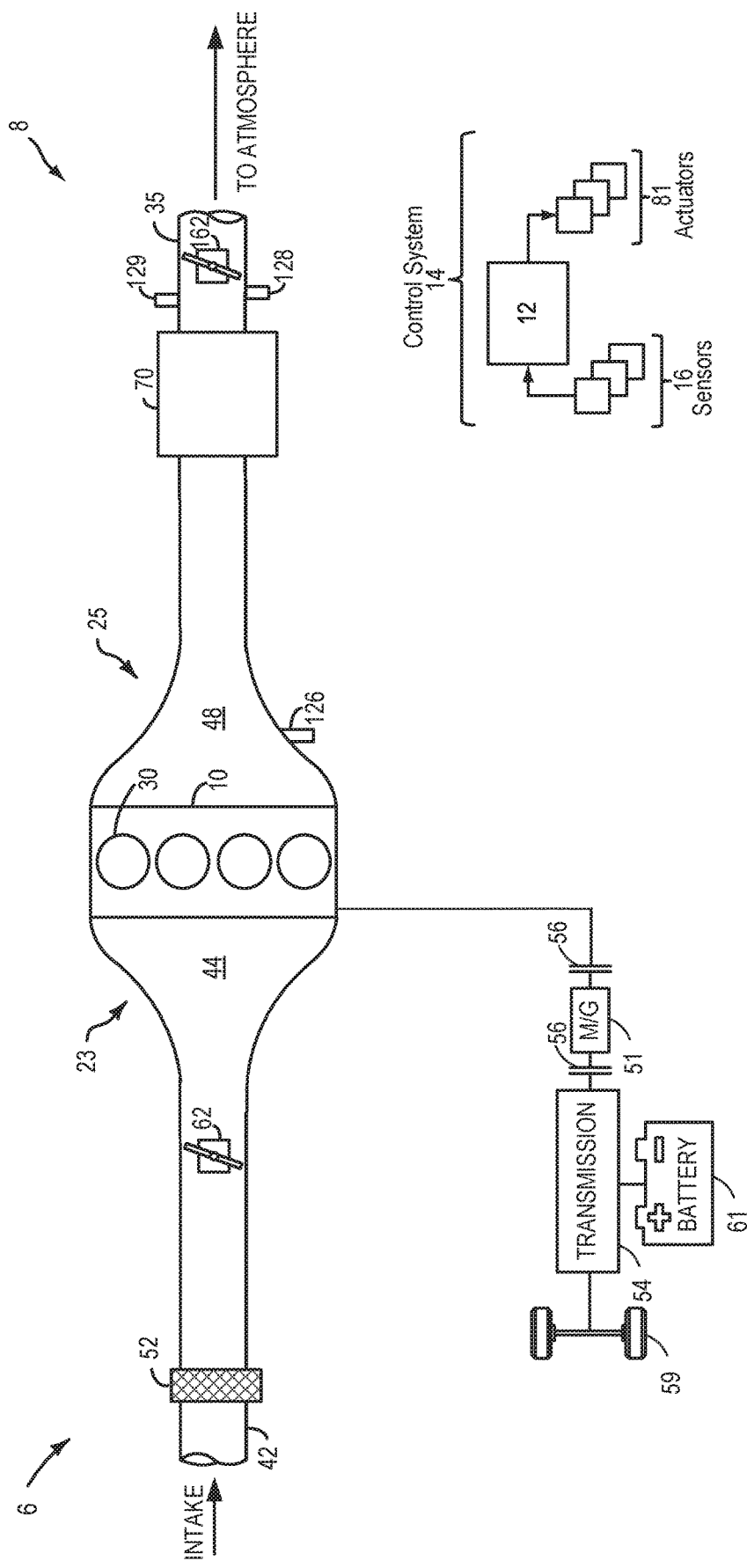
FIG. 1 illustrates a schematic of an engine included in a hybrid vehicle.
Figure 2:
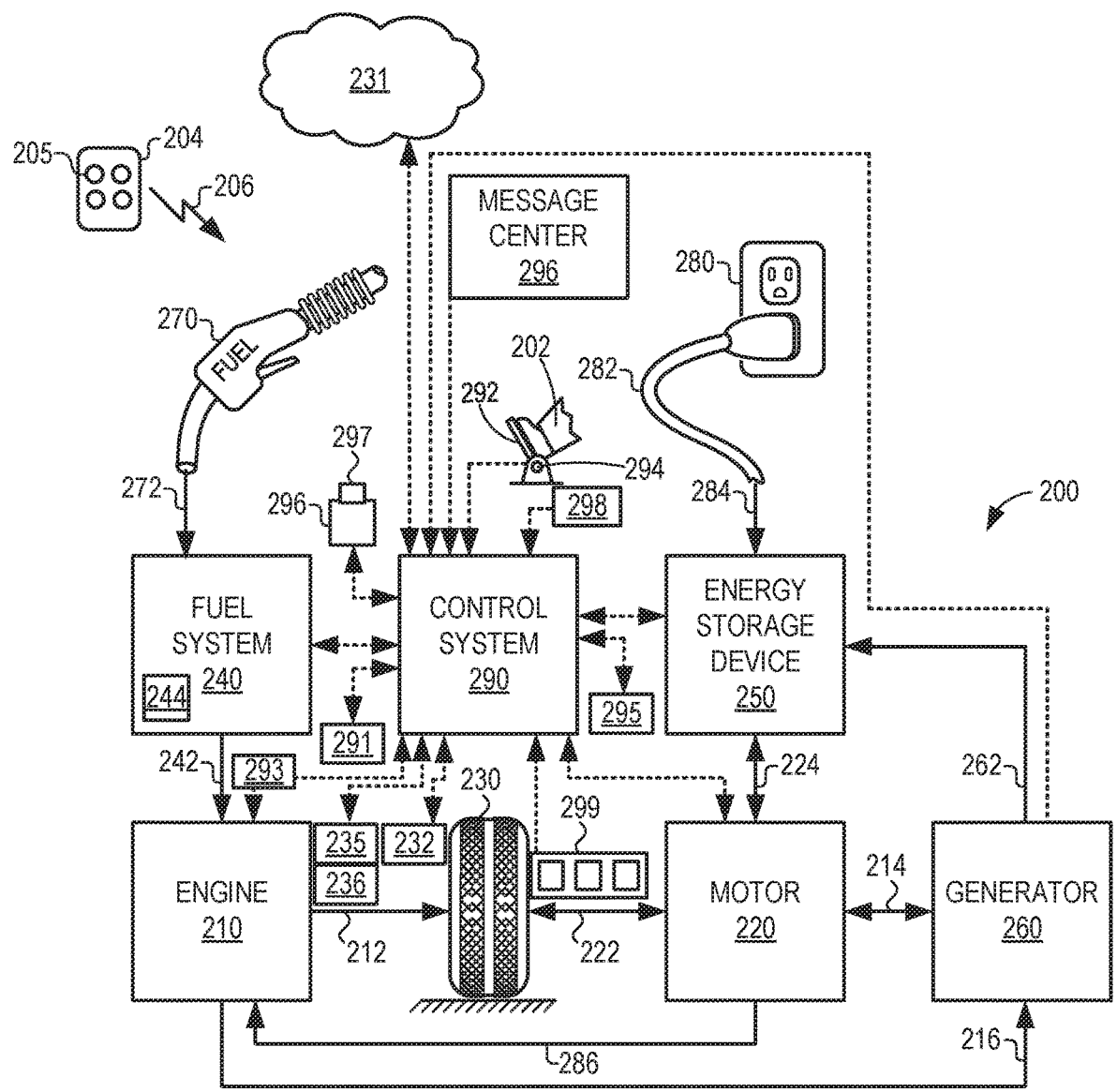
FIG. 2 schematically shows an example vehicle propulsion system

The following description relates to systems and methods for limiting a vehicle speed and vehicle dynamics of a vehicle with either a gas-only or hybrid or electric-only powertrain. More specifically, a top vehicle speed, which may be a maximum, upper threshold speed of the vehicle, may be limited in response to one or more ambient conditions. FIG. 1 illustrates a schematic for a hybrid vehicle and FIG. 2 illustrates a propulsion system for the hybrid vehicle. The FIGS. 1 and 2 illustrate sensors and other devices arranged on the vehicle that may be used to monitor vehicle conditions, ambient conditions, and the like. The vehicle and its sensors may be configured to communicate with other vehicles within a threshold distance and/or to a wireless network. The wireless network may be configured to communicate with a plurality of vehicles, wherein the wireless network may communicate with different subsets of vehicles based on shared characteristics, including vehicle make, vehicle model, vehicle configuration, transportation purpose, and vehicle location.

Figure 3:
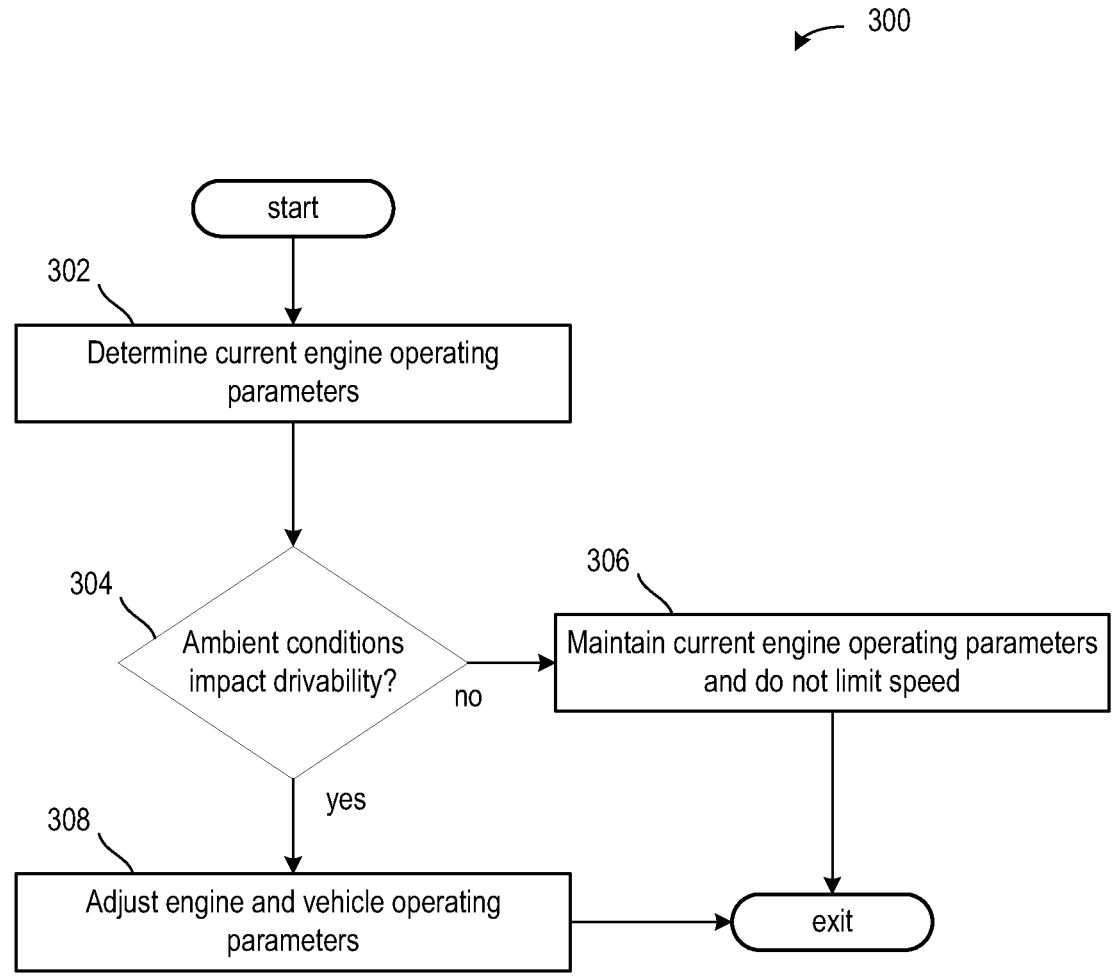
FIG. 3 illustrates a high-level flow chart illustrating a method for adjusting vehicle operating parameters including a vehicle speed and vehicle dynamics in response to ambient conditions.
Figure 4:
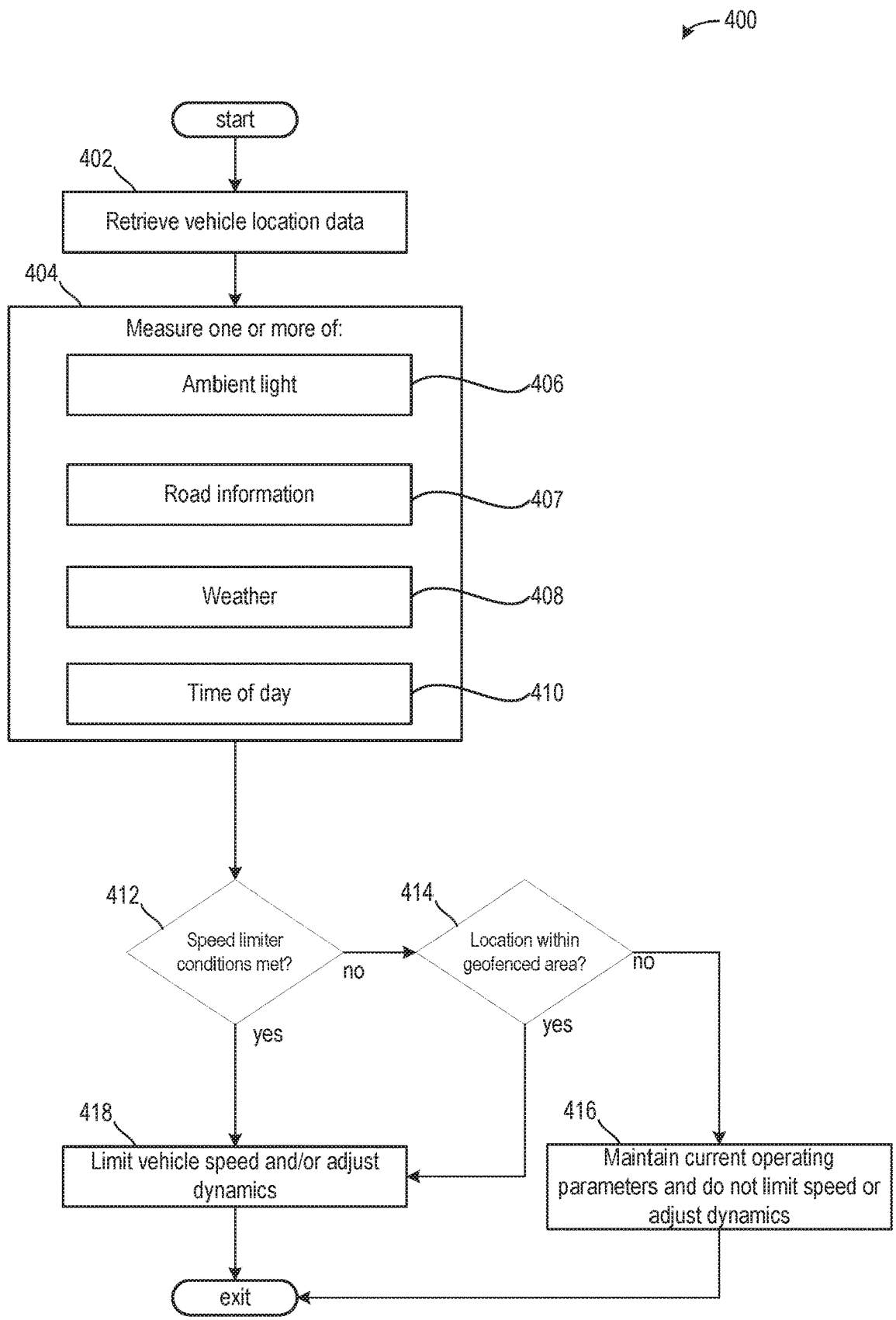
FIG. 4 illustrates a method for determining ambient conditions and limiting a vehicle speed and altering driving dynamics settings based on the ambient conditions and vehicle location.
Figure 5:
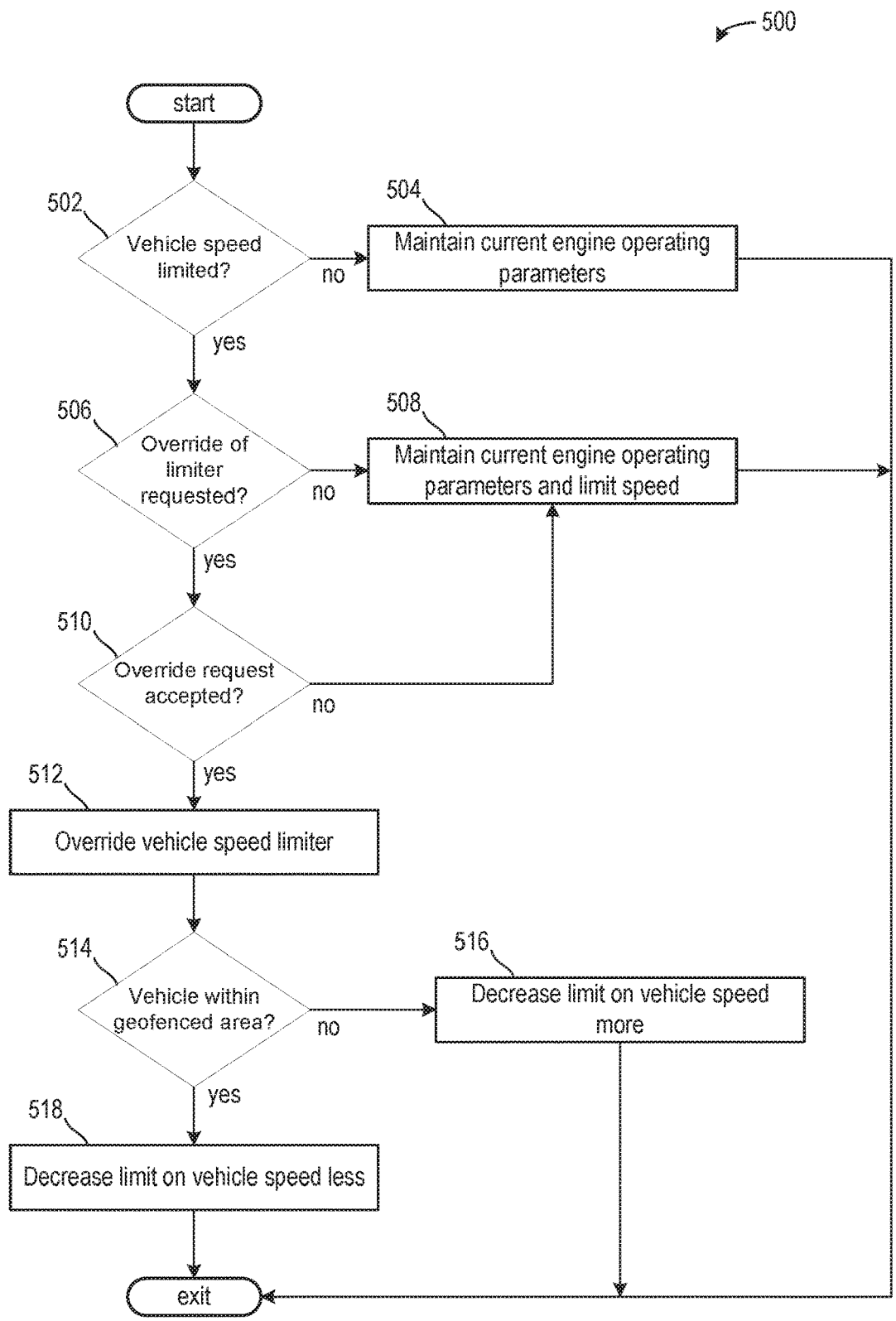
FIG. 5 illustrates a method for determining if the vehicle speed limiter limiting may be overridden.
Figure 6:
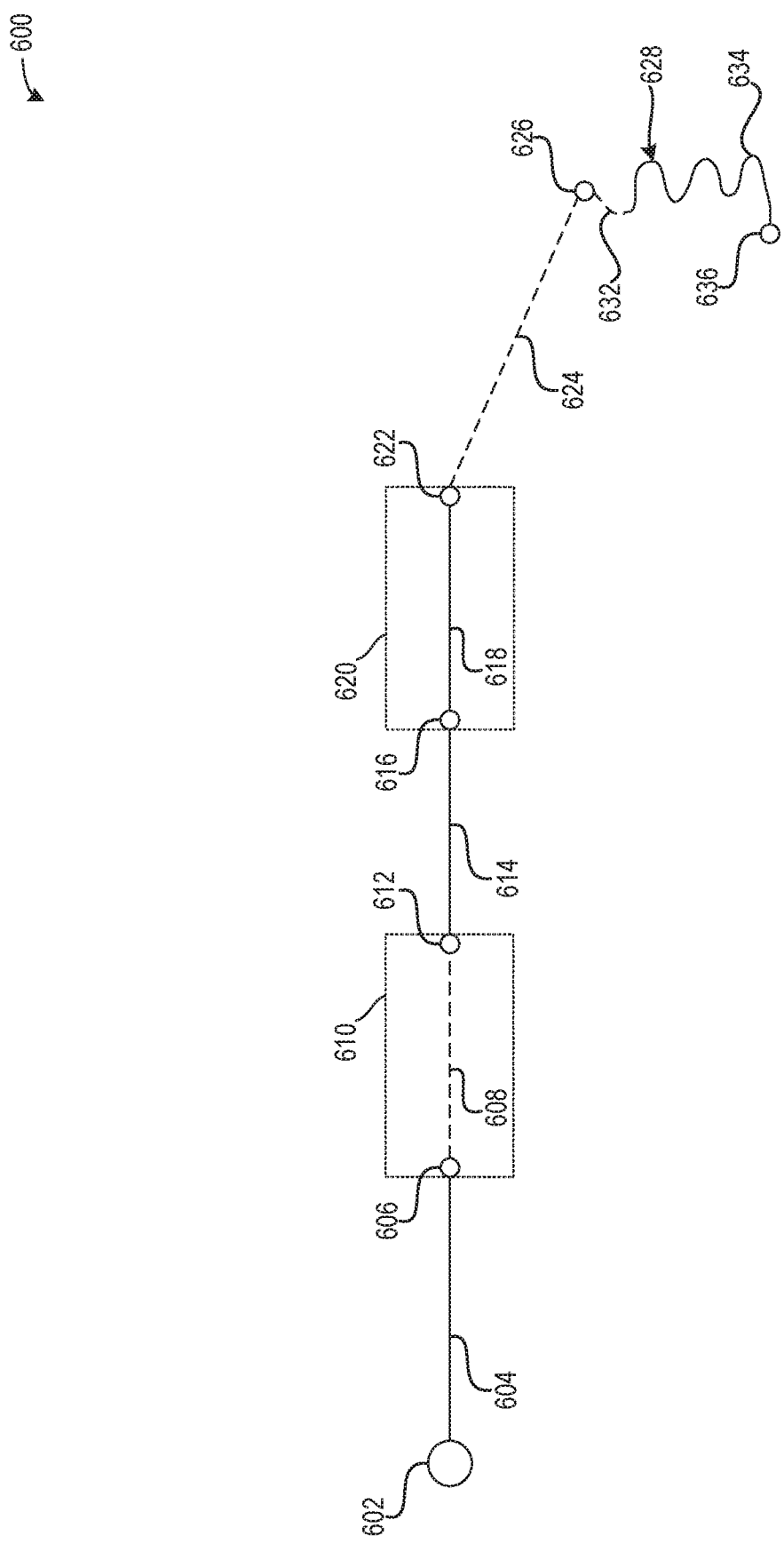
FIG. 6 illustrates a prophetic example for a vehicle travelling along a path comprising a variety of different ambient conditions.
Figure 7:
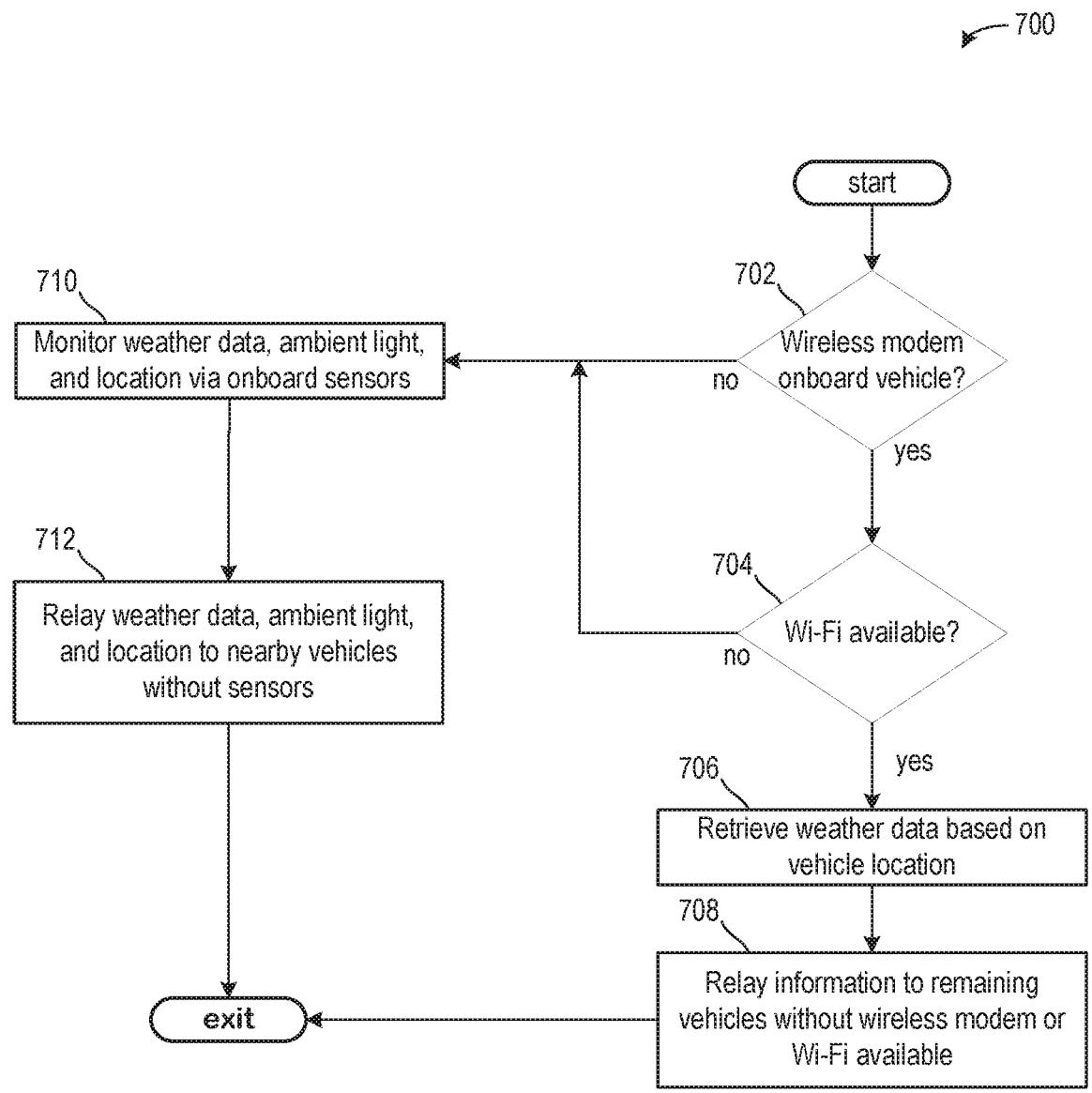
FIG. 7 illustrates a method for determining ambient conditions via onboard sensors or retrieval of ambient conditions wirelessly from other vehicles and/or a wireless network.

FIG. 3 illustrates a method for determining if one or more conditions are met for adjusting vehicle operating parameters including a vehicle top speed and vehicle dynamics. FIG. 4 illustrates a more detailed method comprising determining a plurality of ambient conditions and a vehicle location and determining a magnitude in which, if conditions are met, for a vehicle speed to be limited. FIG. 5 illustrates a method for overriding the vehicle speed limiter in response to an operator request in combination with other factors. FIG. 6 illustrates a prophetic example of a vehicle traveling along a path comprising a variety of ambient conditions which may result in a vehicle speed being limited. FIG. 7 illustrates a method for a vehicle to retrieve current ambient conditions and/or predict future ambient conditions via onboard sensors or feedback from a wireless network or other vehicle. By adjusting the vehicle operating parameters in response to ambient conditions, vehicle smoothness and control may be enhanced, delivering an improved driving experience to the vehicle operator.

In one example, the present disclosure relates to a plurality of vehicles in communication with one another via a large range wireless network and/or via a dedicated-short-range-communication network. The plurality of vehicles may comprise one or more vehicles with a wireless modem, exterior cameras, solar cells, navigation systems, and the like. In one example, the modem and various sensors and devices are arranged on only a single vehicle of the plurality of vehicles, wherein the single vehicle may relay feedback from the various sensors to other vehicles of the plurality of vehicles.

Each of the vehicles of the plurality of vehicles may be equipped with a speed limiter. In one example, the speed limiter is an electronic speed limiter represented by instructions stored in non-transitory memory of a controller onboard the vehicle. The speed limiter may be optionally activated in one or more of the plurality of vehicles in response to feedback from the various sensors. For example, the speed limiter may be activated in response to a vehicle visibility being less than a threshold visibility, wherein feedback for vehicle visibility may be provided by one or more cameras arranged on a vehicle exterior. Additionally or alternatively, vehicle visibility may be correlated to feedback from a solar cell arranged on the vehicle exterior, wherein less ambient light may correspond to decreased vehicle visibility. As another example, the speed limiter may be activated in response to a location of the vehicle, wherein the vehicle may be within a geofenced area. The geofenced area may correspond to an area comprising greater than or equal to a threshold population density (e.g., an urban center of 10,000 or greater). Additionally or alternatively, the geofenced area may include one or more of schools, hospitals, shopping centers, apartment complexes, metropolitan and/or urban areas, stadiums, and the like. In some examples, the geofenced area may include a radius of 5 miles or less with a center of the geofenced area including one or more of schools, hospitals, shopping centers, apartment complexes, metropolitan and/or urban areas, stadiums, and the like.

The speed limiter may be configured to decrease a vehicle top speed to a lower, limited speed. That is to say, the vehicle may comprise a first top speed that is unadulterated and boundless, wherein the speed limiter adjusts the first top speed to a second top speed lower than the first top speed. The second top speed may be a percentage of the first top speed. For example, the second top speed may be equal to 90% or less of the first top speed.

The vehicle dynamics may be configured to specific or matching conditions. That is to say, the vehicle drive modes may be selectable by the operator. During specific conditions, the methods adjust to a sensed ideal drive mode. For example, if the vehicle is in snowy or icy conditions, the controller may activate and/or increase output from a traction control system and a stability control system to increase vehicle traction. As another example, if the vehicle is on a gravel path, the controller may adjust the suspension system to be less stiff, thereby providing increased comfort to the vehicle occupants.

The vehicle dynamics may include a plurality of modes comprising different adjustments to one or more vehicle dynamics features including a traction control system, a stability control system, a power assisted steering system, a vehicle brake assist system (e.g., active brake system or predictive brake system), a vehicle suspension system, exhaust muffler valve, anti-lock brakes, and the like. The plurality of modes may include a dry mode, a wet mode, an ice mode, a snow mode, a geofenced area mode, a rough surface mode, a curvy road mode, an incline mode, a sand mode, a gravel mode, a dirt mode, and the like. Each of the modes may comprise different adjustments to one or more of the vehicle dynamics features to enhance drivability during various ambient and road conditions. Enhancing drivability may include increasing comfort, increasing traction, and decreasing noise, vibration, and harshness. Additionally or alternatively, enhancing drivability may include adjusting the vehicle dynamics features so that a change in drivability is minimized between each of the driving modes, allowing the vehicle operator to maintain their driving behavior.

For example, if the vehicle is identified to be on a curvy road, the vehicle suspension may activate increased damping of the suspension to enhance drivability and comfort. As another example, if the vehicle is identified to be on a gravel or dirt road, the vehicle dynamics mode may activate modified traction control and ABS to increase the vehicle traction and tire grip for the unsmooth surface. In one example, the modified traction control comprises adjusted torque vectoring and enhanced reflexivity to gravel/dirt road conditions compared to a smooth, paved road. As another example, the vehicle dynamics mode may be activated in response to a location of the vehicle, wherein the vehicle may be within a geofenced area. The geofenced area may correspond to an area that may include one or more of schools, hospitals, shopping centers, apartment complexes, metropolitan and/or urban areas and the like. The vehicle dynamics mode may adjust an exhaust system valve to a more closed position (e.g., a fully closed position) to minimize noise and disruption. As another example, if the vehicle is operating late at night during designated sleeping hours, the vehicle dynamics mode may activate closing the exhaust system valve to minimize noise and disruption.

The speed limiter may be overridden in response to an override request. The override request may be accepted or rejected based on one or more conditions. For example, the override request may be accepted if a vehicle operator comprises qualifications (e.g., training or the like) that enable the vehicle operator to desirably maneuver the vehicle at higher speeds than the second top speed during present conditions. As another example, if the vehicle is an emergency vehicle and a siren is activated, then the speed limiter may be overridden. The operating vehicle may be under authority of an agency or company, who can determine to accept or decline the override. As a further example, the speed limiter may be overridden based on a vehicle configuration. For example, if a road path is curvy with a plurality of acute interior angle turns (e.g., hairpin turns), then the speed limiter may be overridden if the vehicle configuration includes a small vehicle, such as a passenger vehicle, with a stiff suspension. However, if the vehicle configuration is a semi-truck or other large vehicle, then the speed limiter may not be overridden on the road path.

The speed limiter may be used in gas, hybrid, electric, semi-autonomous, and autonomous vehicles. For example, autonomous vehicles may have a limited vehicle speed or adjusted vehicle dynamics based on the conditions being met. In some examples, adjustments made to autonomous vehicles may be to a lesser magnitude than in human operated vehicles due to ride comfort being less of a focus or ignored in autonomous vehicles. Furthermore, overriding the speed limiter may be further based on the vehicle being operated autonomously or via a human operator. For example, if an autonomous vehicle is on the curvy road path described above and Wi-Fi is available, then the speed limiter may be overridden as the autonomous vehicle may be able to predict upcoming turns. However, if the vehicle is operated by a human operator or if Wi-Fi is unavailable, then the speed limiter may not be overridden.

In some examples of the present disclosure, additionally or alternatively, a magnitude of the speed limiter may be adjusted. As such, the first top speed may be decreased to a plurality of lower speeds based on visibility, operator and vehicle qualifications, and the like. As an example where an autonomous vehicle and a vehicle operated by a human operator are driving along a same road path with less than the threshold visibility, the speed limiter may reduce the top speed of the autonomous vehicle to a second top speed and the top speed of the vehicle operated by the human operator to a third top speed, where the third top speed is lower than the second top speed. In one example, this is due to the autonomous vehicle being able to compensate for the low visibility via feedback from the navigation system with regard to upcoming curves and turns. It will be appreciated that in some examples, the limiting of the top speed of the autonomous vehicle may be more or less than the limiting of the top speed of the vehicle operated by the human operator in other road paths. This may occur in geofenced areas where pedestrian traffic is relatively high due to the population density being higher than the threshold population density.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may further include an exhaust gas valve 162 in the vicinity of the exhaust passage 35 configured to adjust exhaust gas flow through the exhaust passage 35. The exhaust gas valve 162 may be adjusted, in some examples, to decrease noise emitted from the exhaust passage during certain times of day and/or locations through which the vehicle is driving. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

FIG. 2 illustrates an example vehicle propulsion system 200 which may be used similarly to hybrid vehicle system 6 of FIG. 1. Vehicle propulsion system 200 includes a fuel burning engine 210 and a motor 220. As a non-limiting example, engine 210 comprises an internal combustion engine and motor 220 comprises an electric motor. Engine 210 may be used substantially similarly to engine 10 of FIG. 1 and motor 220 may be used similarly to electric machine 51 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an improvement in fuel economy over other vehicles that do not employ such technology. During the start/stop the vehicle may be propelled via its momentum and not by the engine 210 or the motor 220.

Herein, "automatically" executing various vehicle features, such as S/S, refers to execution of the various features without vehicle operator input. That is to say, the vehicle operator does not directly signal or request the S/S or other automatic features to be executed. As such, automatic features are automatically executed in a response to current operating conditions and may not be directly signaled by the operator.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a stability control sensor, such as a wheel speed and/or a lateral and/or longitudinal acceleration and/or a yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an interior or an exterior surface of the vehicle so that an area surrounding and/or adjacent to the vehicle may be visualized.

In some examples, vehicle propulsion system 200 may further include one or more solar cells 291 arranged on the interior or exterior of the vehicle. The solar cells 291 may provide feedback regarding an amount of ambient light. Solar cells 291 may in some examples be utilized to determine when a sunrise or a sunset is occurring the absence of an available internet connection.

In one example, a sunrise may include from a time (e.g., clock time for a given day of the week) at which the sun is first visible on the horizon at a location on the earth where the vehicle is positioned at that time to a time at which the sun is fully visible. Similarly, a sunset may include a time (e.g., clock time for a given day of the week) at which the sun is last fully visible on the horizon at a location on the earth where the vehicle is positioned at that time to the first time at which it is no longer visible. A sunrise/sunset event may be detected by determining whether the current clock time is at a predicted sunrise or sunset time received from weather broadcast information, internet weather data, etc. Further, the sunrise/sunset time may be determined from real-time sensing of solar cell output or other light sensor output coupled in the vehicle becoming above/below, respective thresholds.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In one example, feedback from the solar cells 291, onboard cameras 235, ambient temperature sensor 298, yaw rate sensor 299, and the like may be used to adjust a vehicle top speed. For example, if one or more of the sensors determines that visibility is less than a threshold visibility, then the vehicle top speed may be decreased. Thus, an unlimited, unadulterated vehicle top speed may be referred to as a first speed. Alternatively, the first speed may be decided by the vehicle manufacturer based on vehicle subsystem parameters such as powertrain durability or tire speed rating. A decreased, adulterated vehicle top speed may be referred to as a second speed. The first speed, additionally or alternatively, may be decreased to a second speed in response to traction being less than a threshold traction.

The threshold visibility may be based on a distance a vehicle operator may visualize from within the vehicle, which may be determined based on feedback from the onboard cameras 235 and solar cells 291. Visibility may be affected by one or more conditions including weather, time of day, and location. For example, if it is heavily raining, visibility may be reduced and as a result, the vehicle operator may visualize less of a travel path. Additionally or alternatively, if the time of day is nighttime, then visibility may also be reduced. Furthermore, visibility may be reduced if a vehicle location is along a curving travel path comprising a plurality of turns with environmental landscapes occluding sections of the travel path. In one example, the threshold visibility is equal to 15 miles. In another example, the threshold visibility is equal to 12 miles. In another example, the threshold visibility is equal to 10 miles. In another example, the threshold visibility is equal to 8 miles. In another example, the threshold visibility is equal to 5 miles. In another example, the threshold visibility is equal to 2 miles. In another example, the threshold visibility is equal to 1 mile. In another example, the threshold visibility is equal to 100 feet. Additionally or alternatively, the threshold visibility may be less than 500 feet. Additionally or alternatively, the threshold visibility may be less than 250 feet.

The driving capacity and threshold traction may be based on an amount of friction imparted from a ground upon which the vehicle is propelled to the vehicle tires. The amount of friction may be dependent on weather conditions, curve of the road, slope of the ground, location, and landscape, temperature, ground composition and tire tread. For example, if the ground is a well-maintained road and weather is dry and warm, then the amount of friction may be relatively high. However, if the ground is a gravel road, then the amount of friction may be relatively low. Additionally or alternatively, if the weather comprises snow or rain and/or if the ambient temperature is below a freezing temperature, then the amount of friction may be relatively low (e.g., at an amount such that friction is less than the threshold traction).

As will be described herein, the vehicle top speed may be automatically limited via a speed limiter from a first vehicle top speed to a plurality of lower vehicle top speeds. As such, a magnitude of the speed limiter may be adjusted such that the first vehicle top speed is decreased to a lower vehicle top speed in response to environmental conditions such as visibility, traction, and vehicle location.

Also described herein, the vehicle dynamics may be automatically changed from a normal setting to a plurality of lower vehicle settings. As such, a magnitude of the vehicle dynamics modes may be adjusted such that the normal mode is decreased to a lower setting in response to environmental conditions such as visibility, traction, and vehicle location.

Turning now to FIG. 3, it shows a high level flow chart illustrating a method 300 for adjusting vehicle operating parameters such as a vehicle speed and vehicle dynamics. In one example, the vehicle speed is a vehicle top speed. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which may include determining, estimating, and/or measuring one or more current engine operating parameters. The current engine operating parameters may include one or more of manifold vacuum, throttle position, engine speed, engine temperature, vehicle speed, and air/fuel ratio.

The method 300 proceeds to 304, which may include determining if ambient conditions impact drivability. Ambient conditions may impact drivability if a reaction time is decreased or if a drive comfort is decreased. The reaction time may correspond to a distance desired to stop a vehicle based on current engine operating conditions and current driving conditions. As such, the reaction time may decrease as the distance desired to stop the vehicle increases. That is to say, if the distance to stop increases from 50 feet to 100 feet, then the vehicle may begin slowing 50 feet earlier for a same given speed. Longer reaction time and distance is enabled by a lower top vehicle speed.

Conditions that may affect the reaction time may include visibility, traction, and location. For example, if visibility is less than a threshold visibility, then an overall reaction time may be reduced. That is to say, the vehicle operator and/or onboard cameras may be unable to visualize objects on a road or its surroundings as quickly due to external obstructions. Additionally or alternatively, while visibility may be greater than or equal to the threshold visibility, traction and other conditions that may affect drivability may decrease the reaction time. For example, if traction (e.g., wheel traction of the vehicle) is low due to a road condition (e.g., road surface is wet, road is a gravel road, etc.), then the reaction time may also decrease. Additionally or alternatively, if a population density of a location of the vehicle is relatively high, then the reaction time may be reduced. A population density may be high if the location corresponds to a school, hospital, shopping center, urban area, a walking trail, or the like.

Drive comfort may decrease based on road conditions, such as road smoothness, traction, and the like. For example, if road conditions increase torque applied to a steering wheel, an electronic power assisted steering may be increased to decrease an amount of force exerted by a vehicle operator to actuate the steering wheel. Additionally or alternatively, if road conditions are unsmooth (e.g., bumpy), the shocks may be adjusted to be less stiff and/or less damping such that oscillations experienced from the road and/or ground surface are mitigated by the shocks, thereby increasing a drive comfort.

If it is determined that current ambient conditions do not affect drivability, then the method 300 proceeds to 306 to maintain current engine operating parameters and does not limit a vehicle speed or adjust vehicle dynamics. As such, a vehicle top speed (e.g., a maximum vehicle speed), may remain unchanged. For example, if the vehicle top speed is 200 miles per hour (mph), then the vehicle top speed remains equal to 200 mph and a speed limiter is not activated. As another example, current vehicle dynamics include traction control and stability control being off, then the method 300 may maintain the traction and stability control off.

If it is determined that current driving conditions do decrease drivability by decreasing the overall reaction time of the vehicle operator such that the vehicle operator has less time to react to a road condition or the vehicle has less time to complete a vehicle operator request or by decreasing drive comfort, then the method 300 proceeds to 308 to adjust engine and vehicle operating parameters including one or more of the vehicle top speed and vehicle dynamics. The top vehicle speed is limited by an amount that may be fixed or dynamic. In some examples, the amount may be a percentage between 5 to 50%. The amount may be adjusted based on an estimated reaction time. For example, if the reaction time is relatively low, then the vehicle speed may be more limited than if the reaction time was higher (e.g., more distance desired to stop rather compared to less). As an example, if the vehicle is on an iced road with visibility less than the threshold visibility, then the vehicle top speed may be reduced more (e.g., via larger percentage) than if the vehicle were on a dry road with visibility less than the threshold visibility.

The amount the top vehicle speed is limited may be between 5 to 45% in some examples. In some examples, additionally or alternatively, the amount the top vehicle speed is limited is between 10 to 40%. In some examples, additionally or alternatively, the amount the top vehicle speed is limited is between 15 to 35%. In some examples, additionally or alternatively, the amount the top vehicle speed is limited is between 20 to 75%. In some examples, additionally or alternatively, the amount the top vehicle speed is limited is between 23 to 27%. In one example, the top vehicle speed is limited to a fixed top vehicle speed, such as 120 mph. However, the fixed top vehicle speed may be adjusted based on a per vehicle basis based on vehicle operator training, onboard vehicle features, and the like. For example, if a vehicle operator is trained to drive in low ambient light (e.g., nighttime), then their top vehicle speed may be less limited or not limited at all relative to an untrained vehicle operator driving in similar conditions. As another example, if the vehicle is a small, passenger vehicle (e.g., a sedan), then the vehicle top speed may be limited less compared to a larger vehicle (e.g., a semi-truck).

The top vehicle speed may be electronically limited in a manner known to those of ordinary skill in the art. In one example, the speed limiter may include limiting a fuel injection to limit a vehicle power output independent of a driver demand. Once a limited top vehicle speed is reached, a fuel injection amount may not be increased so that the limited top vehicle speed is not exceeded.

Adjusting the vehicle dynamics include adjusting one or more of a stiffness of a vehicle suspension system, electric power assisted steering, electric stability control, brake assist, and traction control. By adjusting one or more of these dynamics and a magnitude of their respective outputs, drivability of the vehicle may be enhanced and/or maintained during ambient conditions where drivability may decrease. Ambient conditions which may result in adjustment of vehicle dynamics may include conditions similar to where the vehicle top speed is limited. As such, in some examples, the vehicle top speed and vehicle dynamics may be adjusted in tandem. Additionally or alternatively, only one of the vehicle top speed or vehicle dynamics may be adjusted.

As one example, if the vehicle is an emergency vehicle, such as a police vehicle, and its sirens are activated, and if ambient conditions decrease drivability, then only the vehicle dynamics may be adjusted while the vehicle top speed is left unchanged. While adjusting the vehicle dynamics may indirectly affect the vehicle top speed, in the present example, vehicle operating parameters are not adjusted to directly affect the vehicle top speed. However, aerodynamics and other factors as a result of the adjusted vehicle dynamics may affect the vehicle top speed. In one example, adjusting vehicle operating parameters to directly adjust the vehicle top speed include throttle position, fuel injection amount, fuel injection timing, spark timing, boost, compression ratio, electric motor output, and a number of activated cylinders.

As another example, adjusting the vehicle dynamics may include adjusting one or more of the vehicle dynamics features such that a vehicle dynamic mode is shifted. As mentioned above, the vehicle dynamic mode may be one of a plurality of modes, the plurality of modes including one or more of a dry mode, a wet mode, an ice mode, a snow mode, a geofenced area mode, a rough surface mode, a curvy road mode, an incline mode, a sand mode, a gravel mode, a dirt mode, and the like. The modes may differ from one another with respect to adjustments to one or more of the vehicle dynamics features, wherein the adjustments are made to mitigate noticeable changes to drivability with respect to the vehicle operator and/or vehicle occupants. As such, adjustments to the vehicle dynamics features may still occur if the vehicle is an autonomous vehicle.

Turning now to FIG. 4, it shows a method 400 for determining one or more external conditions of a vehicle to adjust a vehicle top speed and one or more vehicle dynamics. The method 400 begins at 402, which includes retrieving vehicle location data. A navigation system, GPS, cellular device, or other internet device may provide feedback to an onboard vehicle controller (e.g., controller 12 of FIG. 1) or to a wireless network. Additionally or alternatively, GOES radar may be used to determine a position of the vehicle.

The method 400 proceeds to 404, which includes measuring one or more of an ambient light 406, road type and speed limit 407, a weather 408, and a time of day 410. Ambient light (outside the vehicle, in an environment of the vehicle) may be measured via a photovoltaic cell or other light measuring device (e.g., solar cell 291 of FIG. 2) arranged on or near an outer periphery of the vehicle. In some examples, an amount of ambient light may be compared to a threshold ambient light, wherein if the amount of ambient light is less than the threshold ambient light, then visibility may be below the threshold visibility. Ambient light may be less than the threshold ambient light following a sunset and greater than or equal to the threshold ambient light following a sunrise. However, city light pollution may also be used to determine visibility and in some examples, visibility may be above the threshold visibility even when ambient light is less than the threshold ambient light. Road information may include determining a type of road (e.g., pavement, gravel, dirt, off-road, etc.), speed limit, and surface conditions. In one example, if a speed limit sign is unknown for the road due to a sign not being posted or data for the road not being available, the speed limit of the road may be inferred based on visualized surroundings. For example, if a school, hospital, or the like is visualized, the road speed limit may be assumed to be 20 miles per hour. If one or more business buildings are arranged on either side of the road, then the speed limit may be assumed to be 30 miles per hour. Additionally or alternatively, if the speed limit is unknown, a desired speed limit may be calculated based on one or more of the sensed vehicle location data (e.g., weather, light, number of pedestrians, road type, and the like).

The weather (outside the vehicle, in an environment of the vehicle) may be measured via a set of onboard vehicle sensors, including but not limited to a temperature sensor and a humidity sensor. Additionally or alternatively, feedback from the wireless network, the navigation system, a cellular device, or other device may provide current weather and weather forecast. The time of day may be measured via an onboard clock, which may be incorporated into the navigation system or other system of the vehicle. Additionally or alternatively, the onboard clock may be an individual device, such as a timer, used to track time throughout a 24-hour day along with tracking time elapsed for various other vehicle tasks.

In some examples, additionally or alternatively, the vehicle may be included in a vehicle fleet comprising a plurality of vehicles. The plurality of vehicles may communicate via the wireless network of the DSRC network. As such, only one vehicle of the plurality of vehicles may comprise the sensors used to measure ambient light, weather, and time. The one vehicle may relay the information to other nearby vehicles in a same time zone or geographic area comprising similar ambient light and weather conditions. As such, a manufacturing cost per vehicle of the vehicle fleet may be reduced.

The method 400 proceeds to 412, which includes determining if speed limiter conditions are met. Conditions for limiting a vehicle top speed (e.g., a maximum speed) may be met if one or more of the ambient light, road type or condition, weather, and time of day decrease visibility to an amount less than the threshold visibility.

If one of these conditions is not met and vehicle visibility is greater than or equal to the threshold visibility, then the method 400 proceeds to 414 to determine if a vehicle location is within a geofenced area. Herein, geofenced areas refer to areas comprising a population density greater than a threshold density (e.g., 100 people per $km^2$), such that the population density may affect reaction times. Some example geofenced areas may include geographic areas including hospitals, schools, urban/metropolitan areas, shopping centers, walking trails, the like, and a radius extending therefrom. The radius may be less than 10 miles in some examples. In other examples, additionally or alternatively, the radius may be less than 5 miles. In some examples, additionally or alternatively, the radius may be less than 2 miles. In one example, the radius is less than 1 mile. The vehicle location data retrieved at 402 may be cross-referenced to determine if the vehicle is within a geofenced area.

If the vehicle is not within a geofenced area, then the method 400 proceeds to 416 to maintain current engine operating parameters and does not limit the vehicle top speed or adjust vehicle dynamics. As such, the vehicle may be free to drive at its top speed without the top vehicle speed being limited (e.g., reduced).

Returning to 412 and 414, if one or more of the speed limiter conditions is met and/or if the vehicle location is within a geofenced area, then the method 400 proceeds to 418 to limit vehicle speed and/or adjust vehicle dynamics. As described above, the vehicle top speed (e.g., a maximum vehicle speed) may be limited by reducing a fuel injection amount, short gearing, and the like. In this way, the vehicle speed is reduced from a first top speed to a second top speed, lower than the first. In some examples, where each of the speed limiter conditions is met and the vehicle is within the geofenced area, the first top speed may be reduced to a third top speed, lower than the first and second top speeds. In this way, a magnitude of the speed limiter may be increased as a number of conditions affecting drivability (e.g., visibility, traction, and the like) increases. The vehicle dynamics may be additionally adjusted to improve traction and control while mitigating noise, vibration, and harshness.

Additionally or alternatively, some locations may regularly comprise amounts of ambient light lower than the threshold ambient light (e.g., Barrow, Alaska comprises consecutive days with 24 hours of no daylight). As such, a vehicle may be in a nighttime drive mode. In such an example, the magnitude of the speed limiter may be reduced compared to nighttime driving in another location due to the regularity of the low amounts of ambient light. That is to say, the vehicle operator and/or vehicle configuration may be more desirably adapted to operate in the nighttime than a vehicle in a location with more ambient light.

In some examples, the vehicle top speed may be decreased while the vehicle dynamics are unchanged. Such an example may include the vehicle driving through a geofenced area with a smooth driving surface, dry ambient conditions, and ambient light being greater than the threshold light.

In some examples where the vehicle is propelled through a geofenced area, vehicle operating parameters may be adjusted to decrease noise emitted from the vehicle. In one example, the vehicle operating parameters are adjusted to adjust an exhaust gas valve (e.g., valve 162 of FIG. 1) to a more closed position to decrease noise emitted from the vehicle. Additionally or alternatively, if the geofenced area is a residential neighborhood or the like, a headlight intensity may be reduced, wherein the headlight intensity may include an angular range and/or a brightness.

Turning now to FIG. 5, it shows a method 500 for adjusting a limit of the vehicle top speed and vehicle dynamics. The vehicle top speed may be limited (e.g., decreased) to a limited top speed, which may be a percentage of the top vehicle speed, as described above. The method 500 may determine if a request to override the speed limiter is present and if the operator is authorized to override the speed limiter. The method 500 may determine if a request to override the speed limiter is present and if the fleet agency or company vehicle owner is authorized to override the speed limiter. The method 500 may further comprise an amount in which to adjust the speed limiter, such that a magnitude of the speed limiter is decreased. Additionally or alternatively, the speed limiter may be completely overridden in some examples.

The method 500 begins at 502, which includes determining if the vehicle speed is limited. The vehicle speed may be limited if ambient conditions, such as the conditions determined during method 400 of FIG. 4, reducing a reaction time of one or more of the operator and the vehicle are present. That is to say, the method 500 at 502 may continue from 418 of method 400 or 308 of method 300, in one example. If the vehicle speed is not limited and the operator may propel the vehicle up to a top vehicle speed, then the method 500 proceeds to 504 to maintain current engine operating parameters. Furthermore, an override request may or may not be monitored.

In one example, ambient conditions may include conditions outside of the vehicle (e.g., external to an interior cabin of the vehicle) but in the immediate vicinity of the vehicle, which may affect vehicle driving and/or operation. The immediate vicinity may include an area within 1000 meters of the vehicle. It will be appreciated that the area defining the immediate vicinity of the vehicle may be adjusted without departing from the scope of the present disclosure such that the immediate vicinity is less than or greater than 1000 meters of the vehicle.

If the vehicle speed is limited such that a current vehicle top speed is less than a boundless, unadulterated top vehicle speed (e.g., a top vehicle speed free of the limit), then the method 500 proceeds to 506 to determine if an override request is present. An override request of the speed limiter may be present if one or more of a button is depressed, an accelerator pedal is depressed further or in a pattern, a siren is active, or the like. For example, the button may be a button on the steering wheel or other location that the operator may depress to signal the override request. The pattern in which the accelerator pedal is depressed may include two or more successive depressions of the accelerator pedal. Additionally or alternatively, if the vehicle is an emergency vehicle equipped with emergency sirens, activation of the emergency sirens may signal an override request. At any rate, it will be appreciated that the override request may be signaled via an operator behavior outside of behaviors used to propel the vehicle. That is to say, the override request is signal via a purposeful, deliberate movement of the operator, wherein the movement does not mimic operator movements used to currently propel the vehicle. In this way, the operator may not accidentally signal an override request unlike previous examples where the operator may simply further depress the accelerator pedal.

If the override request is not present, then the method 500 proceeds to 508 to maintain current engine operating parameters and does not adjust a magnitude in which the top vehicle speed is limited. If the override request is present, then the method 500 proceeds to 510 to determine if the override request is accepted. The override request may be accepted if the operator is authorized to override the speed limiter. The operator may be authorized to override the speed limiter if the operator has received specialized training or the like. For example, the specialized training may include driving at nighttime when ambient light is less than the threshold light, driving in severe weather conditions including snow, ice, rain, high winds, and the like, and driving with low visibility due to one or more of a road travel path, ambient light, and weather.

Additionally or alternatively, the override request may be accepted based on a configuration of the vehicle. For example, the override request may be accepted if the vehicle has a Wi-Fi connection and is being driven autonomously as the vehicle may receive real-time directions such that visibility affects drivability to a lesser extent. Additionally or alternatively, the override request may be accepted based on a vehicle size, transmission system, and sensor configuration. For example, if the vehicle is equipped with chains that surround the wheels and provide increased traction, then the override request may be accepted. Additionally or alternatively, if the transmission system is an all-wheel drive transmission system, then the override request may be accepted while a vehicle with a rear-wheel drive transmission system may not receive an accepted override request.

If the operator is not authorized to override the speed limiter or if a vehicle configuration does not meet a desired configuration, then the method 500 proceeds to 508 and does not adjust the magnitude in which the top vehicle speed is limited. The desired configuration may be adjusted based on the various conditions decreasing drivability. For example, a configuration desired for wet conditions may be different than a configuration desired for nighttime driving.

If the operator is authorized and has received specialized training of if the vehicle configuration meets the desired configuration, then the method 500 proceeds to 512 to override the vehicle speed limiter. This may include a full override such that the speed limiter is no longer active and the current top speed is returned to an original, boundless top vehicle speed. Additionally or alternatively, the override may include a partial override such that the magnitude of the speed limiter is decreased so that the current top speed is increased while still being less than the original, boundless top vehicle speed.

The method 500 proceeds to 514, which includes determining if the vehicle is within a geofenced area. 514 may be substantially similar to 414 of method 400 of FIG. 4. If the vehicle is not within a geofenced area, then the method 500 proceeds to 516 to decrease the magnitude of the speed limiter so that the current top vehicle speed more closely resembles the original, boundless, top vehicle speed. If the vehicle is within a geofenced area, then the method 500 proceeds to 518 to increase the magnitude of the speed limiter so that the current top vehicle speed becomes more limited and may move closer to a top vehicle speed corresponding to the speed limiter without the override.

In some examples, the magnitude of the speed limiter may be adjusted based on gas, hybrid, electric, semi-autonomous, and/or autonomous driving modes. For example, if a vehicle is being semi-autonomously propelled such that a vehicle operator is driving the vehicle with the assistance of one or more onboard sensors, then the magnitude of the speed limiter may be less than the magnitude of the speed limiter for a vehicle without the one or more onboard sensors to assist the vehicle operator to drive the vehicle. The one or more onboard sensors may assist the vehicle operator to maintain within boundaries of a lane, change lanes, brake in response to an object ahead of the vehicle, and the like.

In some examples, if it is determined that the onboard sensors, such as cameras and the like, have decreased visibility due to ambient conditions (e.g., fog) while a vehicle operator has visibility greater than the threshold visibility, then the magnitude of the speed limiter may be increased if the vehicle is in an autonomous driving mode compared to if the vehicle is being driven semi-autonomously or only via the vehicle operator.

In some examples of the method 500, an override request may also request changes to the vehicle dynamics. For example, the vehicle operator may prefer to operate the vehicle without electric stability control or with a stiffer suspension. The request may be granted based on vehicle configuration and vehicle operator credentials, as described above.

Turning now to FIG. 6, it shows an example 600 of a travel path along which a vehicle travels. In the example of FIG. 6, portions of the travel path defined by dashed boxes may indicate geofenced areas. Additionally, portions of the travel path illustrated via a dashed line may indicate portions of the travel path where a vehicle top speed is limited due to ambient conditions within the travel path and/or the portion of the travel path being within a geofenced area.

An operator may begin propelling a transport device (e.g., a vehicle) at a first location 602, toward a second location 606 along a first segment 604. The first segment 604 is not marked as a geofenced area. Additionally or alternatively, ambient conditions in the first segment 604 may be such that operator and vehicle reaction times are equal to a threshold reaction time. As such, the vehicle top speed may not be limited. In the example of FIG. 6, segments of the travel path illustrated via solid line may indicate segments of the travel path where the vehicle top speed is not limited. As an example, the first segment 604 may be a highway.

After reaching the second location 606, the operator may propel the vehicle toward a third location 612 along a second segment 608. Each of the second location 606, the third location 612, and the second segment 608 may be arranged within a first geofenced area 610. As an example, the first geofenced area 610 may correspond to a shopping mall, hospital, school, urban area (e.g., a downtown area of a densely populated city), or the like. As such, the vehicle top speed is limited as the vehicle travels along the second segment 608.

After reaching the third location 612, the vehicle is propelled toward a fourth location 616 along a third segment 614. The third segment 614 is arranged outside of the first geofenced area 610 and the speed limiter is removed such that the vehicle top speed is returned to a vehicle top speed that is not limited. In one example, the vehicle top speed during the first segment 604 is equal to the vehicle top speed during the third segment 614. The speed limiter may be removed following propulsion of the vehicle away from the third location 612 with or without an operator request to override the speed limiter. In this way, the speed limiter may be automatically removed in response to sensed ambient conditions, road conditions, and/or a vehicle location without the override request being present.

After reaching the fourth location 616, the vehicle may be positioned in a second geofenced area 620. Thus, as the vehicle travels along a fourth segment 618 to a fifth location 622, the vehicle top speed may be limited. However, as an example, the second geofenced area 620 may correspond to a school or the like with specified hours of operation. In one example, the vehicle is in the second geofenced area 620 outside of the specified hours of operation of the school. As such, the speed limiter may not be activated in the second geofenced area 620.

After reaching the fifth location 622, the speed limiter may be activated and the top vehicle speed is limited as the vehicle travels along a fifth segment 624 to a sixth location 626. In one example, the speed limiter is activated due to a combination of road and ambient conditions. For example, the road may comprise a high angle decline (e.g., greater than 10-degree decline) and the weather may reduce visibility and operator and vehicle response time (e.g., it is currently snowing and snow is built up on the road). In one example, the speed limiter activated in response to conditions along the fifth segment 624 may limit the top vehicle speed similarly to the speed limiter during the second segment 608. Additionally or alternatively, the magnitudes of the speed limiters during the fifth segment 624 and the second segment 608 may be different. In one example, the magnitude of the speed limiter during the second segment 608 may be greater than a magnitude of the speed limiter during the fifth segment 624 due to the vehicle being in the first geofenced area 610, thereby indicating an area comprising a high population density. In this way, a number of pedestrians in the second segment 608 is greater than a number of pedestrians in the fifth segment 624, wherein the limiting of the top vehicle speed increases as the number of pedestrians increases.

After reaching the sixth location 626, the vehicle may travel along a sixth segment 628 to a seventh location 636. The sixth segment 628 may comprise a winding road, wherein the sixth segment 628 comprises a number of hairpin or other acute inner angle turns. As such, the speed limiter may remain active during a first portion 632 of the sixth segment 628. However, the operator may request an override of the speed limiter. It may be determined that the operator is authorized to override the speed limiter during road conditions similar to conditions along the sixth segment 628 due to training, vehicle configuration, or the like. As such, the speed limiter is removed (e.g., deactivated) during a second portion 634 of the sixth segment 628. In some examples, additionally or alternatively, the magnitude of the speed limiter may be reduced during the second portion 634 such that the speed limiter is still active, but decreases the vehicle top speed to a lesser extent.

In a real world example comprising an emergency vehicle and a non-emergency vehicle driving on the same road in similar conditions with speed limiter conditions being met for both, a vehicle top speed of an emergency vehicle may be less limited than a vehicle top speed of a non-emergency vehicle (e.g., a civilian vehicle). In one example, the vehicle top speed of the emergency vehicle is reduced by 10% and the vehicle top speed of the non-emergency vehicle is reduced by 20%. Additionally or alternatively, the vehicle dynamics of each of the emergency vehicle and non-emergency vehicle may be adjusted similarly.

As another example real-world example comprising a sedan and a semi-truck driving on the same road in similar conditions with speed limiter conditions being met for both, a vehicle top speed of the sedan may be less limited than a vehicle top speed of the semi-truck. In one example, the vehicle top speed of the sedan is reduced by 25% and the vehicle top speed of the semi-truck is reduced by 40%.

As a further real-world example comprising a vehicle driving on a first road comprising icy conditions and located within a geofenced area may include where the vehicle top speed is reduced by 35%. Additionally, the vehicle may begin driving on a second road comprising icy conditions and located in a non-geofenced area, wherein the vehicle top speed is reduced by 20%.

Turning now to FIG. 7, it shows a method 700 for gathering ambient conditions and vehicle location data via Wi-Fi or wireless communications with another vehicle. In one example, the method 700 is executed during the method 400 of FIG. 4. The method 700 may correspond to 404 to 414 of method 400.

The method 700 begins at 702, which includes determining if a wireless modem is onboard at least one vehicle. In one example, at least one vehicle is a vehicle of a plurality of vehicles of a vehicle fleet. In one embodiment, at least one vehicle may be identical to each of the vehicles of the plurality of vehicles. In other embodiments, at least one vehicle may be different than some or all of the vehicles of the plurality of vehicles. For example, the plurality of vehicles may include one or more of sedans, trucks, sport utility vehicles, semi-trucks, and the like. Additionally or alternatively, the plurality of vehicles may include emergency vehicles, commercial vehicles, hybrid vehicles, semi-autonomous vehicles, and autonomous vehicles.

If at least one vehicle comprises a wireless modem, then the method 700 may proceed to 704, which may include determining if Wi-Fi is available. Wi-Fi may be available if the modem may communicate with a server or other internet device (such as an internet device of another vehicle, business, or the like), such that a controller of at least one vehicle may access information the internet.

If Wi-Fi is available, then the method 700 may proceed to 706, which may include at least one vehicle weather data and location data for the vehicle. More specifically, at least one vehicle may retrieve weather data for its corresponding geographic location.

The method 700 may proceed to 708, which may include relaying the information regarding the weather data to or from other vehicles. In some examples, the relaying may be over the internet (V2X), wherein the other vehicles may be located inside or outside of a threshold distance (e.g., 1000 ft.). In some examples, the threshold distance corresponds to a city limits. Additionally or alternatively, the threshold distance may be based on a road, wherein data is shared with vehicle arranged on the same road. Therefore, road conditions and other conditions may be shared between vehicles. As another example, the threshold distance may correspond to geofenced and non-geofenced areas. As such, vehicles within the same geofenced area may share data and vehicles within the same non-geofenced area may share data. In other examples, the relaying may be over a DSRC network (e.g., V2V), wherein the other vehicles may be located within the first threshold distance.

In some examples, positions of other vehicles may be determined based on communication between at least one vehicle and the other vehicles. The other vehicles may ping a satellite or provide some other indication of their position as they communicate with at least one vehicle. As such, at least one vehicle may provide weather data to the other vehicles, and as it does so, may further determine a position of each vehicle of the other vehicles, wherein the position is shared with a corresponding vehicle.

Returning to 702 and/or 704, if a wireless modem is not onboard the vehicle or if a Wi-Fi connection is not available to a vehicle with a wireless modem onboard, then the method 700 may proceed to 710 to monitor weather data, ambient light, road conditions, and a vehicle location via onboard sensors.

The method 700 may proceed to 712, which may include relaying the weather data, ambient light, road conditions to vehicles without the corresponding sensors. Additionally or alternatively, as the communication occurs, locations of the vehicles without sensors may be determined and provided thereto as described above. Thus, the relaying may occur over the DSRC network without Wi-Fi.

In one example, a plurality of vehicles may be manufactured, wherein at least one of vehicles comprises a wireless modem and a plurality of onboard sensors coupled to provide feedback to a controller, the controller coupled to the wireless modem. However, each of the vehicles may be configured to communicate over the DSRC network. As such, at least one vehicle may determine conditions impacting drivability via the wireless modem when Wi-Fi is available or via the onboard sensors when Wi-Fi is not available. At least one vehicle may then share the information with the other vehicles of the plurality of vehicles so that each of the plurality of vehicles may execute the speed limiter as desired.

In some examples, each of the plurality of vehicles is identical in make and model. In other examples, each of the plurality of vehicles may be different in one or more of make and model. In one example, the plurality of vehicles may comprise of one or more of cars, trucks, sport utility vehicles (SUV), police cars, semi-trucks, ambulances, fire trucks, mail trucks, and other vehicles. The plurality of vehicles may be spark-ignited, compression ignition, and/or electric. Additionally or alternatively, the plurality of vehicles may be autonomous, semi-autonomous, and/or hybrid.

In this way, a vehicle top speed and vehicle dynamics may be adjusted in response to one or more conditions or vehicle types or use types. Adjusting a vehicle top speed limiter may include adjusting a fueling or other engine operating parameter to limit an engine power output to decrease a maximum speed of a vehicle in response to ambient conditions outside the vehicle. Thus, the maximum speed of the vehicle is adjusted to a lower, temporary maximum speed in response to the ambient conditions, wherein the lower maximum speed of the vehicle may return to the maximum speed in response to the ambient conditions changing and the vehicle top speed limiter being deactivated. The vehicle dynamics may be adjusted to increase drive comfort and drivability, and may be done independently or in tandem with the vehicle top speed limiting. The technical effect of adjusting the vehicle top speed and vehicle dynamics is to increase reaction time for the operator or increase vehicle performance during conditions that would otherwise during increased speeds decrease vehicle performance and drivability. Furthermore, a magnitude of the adjusting may be adjusted based on a variety of conditions, including vehicle configuration, weather conditions, vehicle location, vehicle operator training, and the like. By doing this, the vehicle top speed and vehicle dynamics may be adjusted to meet driver and/or vehicle qualifications and external conditions.

An embodiment of a method comprises adjusting a vehicle top speed limiter in response to a vehicle being arranged within a geofenced area to decrease a vehicle top speed. A first example of the method further includes where the geofenced area comprises where a population density is above a threshold population density. A second example of the method, optionally including the first example, further includes where the geofenced area corresponds to one or more a school, a hospital, a shopping center, an urban area, and a stadium. A third example of the method, optionally including the first and/or second examples, further includes where adjusting the vehicle top speed and vehicle dynamics in response to one or more of local weather conditions decreasing a response time of the vehicle to less than a threshold response time, ambient light being less than a threshold ambient light, and road conditions and/or road surroundings decreasing visibility to less than a threshold visibility. A fourth example of the method, optionally including one or more of the first through third examples, further includes where gathering a vehicle location via Wi-Fi or via communication with a vehicle within a threshold proximity. A fifth example of the method, optionally including one or more of the first through fourth examples, further includes where the vehicle is a hybrid vehicle, further comprising wherein the vehicle is an autonomous vehicle.

An embodiment of a system comprises a plurality of vehicles comprising a dedicated-short-range-communication network, wherein at least one vehicle of the plurality of vehicles comprises one or more of a wireless modem and a solar cell, a controller with computer-readable instructions stored on non-transitory memory thereof that when executed enable the controller to retrieve weather data, road data, sunrise and sunset times, and location data for at least one vehicle, infer location data of other vehicles of the plurality of vehicles relative to at least one vehicle, and adjust a speed limiter to adjust a vehicle top speed of a vehicle of the plurality of vehicles in response to weather data, road data, sunrise and sunset times, and location data corresponding to the vehicle. A first example of the system further comprises where the instructions further enable the controller to adjust the speed limiter to decrease the vehicle top speed in response to one or more the vehicle being arranged within a geofenced area, a vehicle response time being less than a threshold response time, and visibility being less than a threshold visibility. A second example of the system, optionally including the first example, further comprises where visibility is reduced in response to weather data indicating snow or rain, ambient light being less than a threshold ambient light, and the road data indicating the road is winding, and where visibility is estimated via a camera arranged on the interior or exterior of the vehicle. A third example of the system, optionally including the first and/or second examples, further comprises where each vehicle of the plurality of vehicles comprises the wireless modem and the solar cell. A fourth example of the system, optionally including one or more of the first through third examples, further comprises where at least one vehicle is the only vehicle of the plurality of vehicles comprising one or more of the solar cell and the wireless modem. A fifth example of the system, optionally including one or more of the first through fourth examples, further comprises where instructions further enable the controller to adjust a magnitude of the speed limiter to decrease a limiting of the vehicle top speed in response to an override request, wherein the override request is accepted in response to an operator being authorized to override the speed limiter. A sixth example of the system, optionally including one or more of the first through fifth examples, further comprises where the override request is signaled via one or more of depressing a button, activating a vehicle siren, and depressing a pedal in a pattern. A seventh example of the system, optionally including one or more of the first through sixth examples, further comprises where the plurality of vehicles comprises autonomous vehicles, semi-autonomous vehicles, and hybrid vehicles. An eighth example of the system, optionally including one or more of the first through seventh examples, further comprises where the speed limiter decreases the vehicle top speed by 10% or more.

A vehicle system comprising an engine and a controller with computer-readable instructions stored on non-transitory memory thereof that when executed enable the controller to retrieve location data and weather data from a navigation system, retrieve traction data from a yaw sensor and/or vehicle wheel speed sensors, retrieve visibility data from cameras arranged on the interior or exterior of a vehicle, and decrease a first vehicle top speed via a speed limiter to a second vehicle top speed in response to one or more of the vehicle being arranged in a geofenced area, a traction being less than a threshold traction, and a visibility being less than a threshold visibility. A first example of the vehicle system further includes where the instructions further enable the controller to override the speed limiter in response to a siren of the vehicle being activated. A second example of the vehicle system, optionally including the first example, further comprises where the override is a full-override or a partial override, and where the full override includes returning a vehicle top speed to the first vehicle top speed, and where the partial override includes increasing the vehicle top speed from the second vehicle top speed to a third vehicle top speed less than the first vehicle top speed and greater than the second vehicle top speed. A third example of the vehicle system, optionally including the first and/or second examples, further includes where the vehicle is a semi-autonomous or an autonomous hybrid vehicle. A fourth example of the vehicle system, optionally including one or more of the first through third examples, further includes where the instructions further enable the controller to relay location data, weather data, traction data, and visibility data to other vehicles within a threshold proximity.

In another representation, the vehicle is a hybrid vehicle comprising semi-autonomous and/or fully autonomous features.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    adjusting a vehicle top speed limiter in response to a vehicle being arranged within a geofenced area to decrease a vehicle top speed, wherein the vehicle is part of a vehicle fleet that comprises a plurality of vehicles, wherein the plurality of vehicles of the vehicle fleet form a dedicated-short-range-communication network and communicate with each other, wherein each of the plurality of vehicles of the vehicle fleet comprises a speed limiter, wherein the vehicle top speed limiter is the speed limiter corresponding to the vehicle, and wherein the vehicle is the only vehicle of the plurality of vehicles of the vehicle fleet comprising one or more of a solar cell and a wireless modem; and
    adjusting a magnitude of the vehicle top speed limiter to decrease a limiting of the vehicle top speed of the vehicle in response to an override request, wherein the override request is signaled via depression of a pedal of the vehicle in a pattern, the pattern including two or more successive depressions of the pedal.

2. The method of claim 1, wherein the geofenced area comprises a population density above a threshold population density, and wherein vehicle operating parameters are adjusted to decrease noise emitted from the vehicle responsive to the vehicle being arranged within the geofenced area, wherein the vehicle operating parameters adjusted to decrease the noise emitted include adjustments to an exhaust valve of the vehicle.

3. The method of claim 1, wherein the geofenced area corresponds to a residential neighborhood and one or more of a school, a hospital, a shopping center, an urban area, and a stadium, and wherein vehicle operating parameters including a headlight intensity are adjusted responsive to the vehicle being arranged within the geofenced area corresponding to the residential neighborhood.

4. The method of claim 1, further comprising adjusting the vehicle top speed and vehicle dynamics in response to one or more of weather conditions decreasing a response time of the vehicle to less than a threshold response time, ambient light being less than a threshold ambient light, and road conditions and/or road surroundings decreasing visibility to less than a threshold visibility, and wherein only a subset of the plurality of vehicles in the vehicle fleet comprise sensors to measure one or more of the ambient light and the weather conditions.

5. The method of claim 1, further comprising gathering a location of the vehicle via Wi-Fi or via communication with a vehicle within a threshold proximity.

6. The method of claim 1, wherein the magnitude of the vehicle top speed limiter is adjusted based on the vehicle being a hybrid vehicle and based on the vehicle being in an autonomous vehicle mode.

7. The vehicle system of claim 1, wherein the magnitude of the vehicle top speed limiter is adjusted to decrease the limiting of the vehicle top speed of the vehicle in response to the override request after the override request is authorized, wherein the override request is authorized based on a vehicle configuration, wherein the vehicle configuration includes a size of the vehicle.

8. A system, comprising:
    a plurality of vehicles comprising a dedicated-short-range-communication network, wherein the plurality of vehicles are part of a vehicle fleet, wherein the plurality of vehicles are in communication with each other, wherein one vehicle of the plurality of vehicles comprises one or more of a wireless modem and a solar cell, wherein the one vehicle is the only vehicle of the plurality of vehicles of the vehicle fleet comprising one or more of the solar cell and the wireless modem, and wherein each of the plurality of vehicles of the vehicle fleet comprises a speed limiter;
    a controller with computer-readable instructions stored on non-transitory memory thereof that when executed enable the controller to:
        retrieve weather data, road data, sunrise and sunset times, and location data for the one vehicle;
        infer location data of other vehicles of the plurality of vehicles relative to the one vehicle; and
        adjust the speed limiter of a vehicle of the plurality of vehicles to adjust a vehicle top speed and adjust vehicle dynamics features to adjust drivability of the vehicle of the plurality of vehicles in response to the weather data, the road data, the sunrise and sunset times, and the location data corresponding to the one vehicle, wherein the vehicle of the plurality of vehicles is any one vehicle of the plurality of vehicles.

9. The system of claim 8, wherein the instructions further enable the controller to adjust the speed limiter to decrease the vehicle top speed in response to one or more of the vehicles being arranged within a geofenced area, a vehicle response time being less than a threshold response time, and visibility being less than a threshold visibility, wherein the speed limiter decreases the vehicle top speed by 10% or more.

10. The system of claim 8, wherein the visibility is reduced in response to the weather data indicating snow or rain, ambient light being less than a threshold ambient light, and the road data indicating a road is winding, and where the visibility is estimated via a camera arranged on an interior or an exterior of the one vehicle.

11. The system of claim 8, wherein the instructions further enable the controller to adjust a magnitude of the speed limiter to decrease a limiting of the vehicle top speed and the vehicle dynamics features in response to an override request, wherein the override request is accepted in response to an operator being authorized to override the speed limiter, wherein an agency or a company authorizes the operator to override the speed limiter.

12. The system of claim 11, wherein the override request is signaled via one or more of activating a vehicle siren and depressing a pedal in a pattern.

13. The system of claim 8, wherein the one vehicle relays information to vehicles of the plurality of vehicles in the vehicle fleet that are within a geographic area comprising similar ambient light and weather conditions.

14. The system of claim 8, wherein the vehicle dynamics features include an electronic stability control, an electric power assisted steering, a brake assist, a traction control system, and a shock damping, wherein the instructions further enable the controller to adjust one or more parameters of the vehicle dynamics features to increase traction and decrease noise, vibration, and harshness.

15. The vehicle system of claim 8, wherein the one vehicle is the only vehicle of the plurality of vehicles in the vehicle fleet comprising sensors to measure ambient light, weather, and time.

16. The vehicle system of claim 8, wherein each of the plurality of vehicles of the vehicle fleet are identical to one another.

17. A vehicle system, comprising:
an engine;
one or more of a solar cell and a wireless modem; and
a controller with computer-readable instructions stored on non-transitory memory thereof that when executed during operation of the vehicle system enable the controller to:
retrieve location data and weather data from a navigation system;
retrieve traction data from a yaw sensor and/or vehicle wheels speed sensors;
retrieve visibility data from cameras arranged on an interior or an exterior of a vehicle; and
decrease a first vehicle top speed via a speed limiter to a second vehicle top speed and adjust one or more vehicle dynamics from a first mode to a second mode in response to one or more of the vehicle being arranged in a geofenced area, wherein a traction being less than a threshold traction, and a visibility being less than a threshold visibility in the geofenced area,
wherein the vehicle is part of a vehicle fleet that comprises a plurality of vehicles,
wherein the vehicle is the only vehicle of the plurality of vehicles in the vehicle fleet that includes one or more of the solar cell and the wireless modem,
wherein the vehicle is equipped with the speed limiter and a remainder of the plurality of vehicles in the vehicle fleet are also each equipped with a corresponding speed limiter, and
wherein the instructions further enable the controller to override the speed limiter of the vehicle in response to a siren of the vehicle being activated.

18. The vehicle system of claim 17, wherein the override is a full-override or a partial override, and where the full override includes returning a vehicle top speed to the first vehicle top speed and the vehicle dynamics returning to the first mode, and where the partial override includes increasing the vehicle top speed from the second vehicle top speed to a third vehicle top speed less than the first vehicle top speed and greater than the second vehicle top speed.

19. The vehicle system of claim 17, wherein the instructions further enable the controller to relay the location data, the weather data, the traction data, and the visibility data to and from other vehicles of the vehicle fleet that are within a threshold proximity, wherein the threshold proximity includes vehicles in a same time zone.

20. The vehicle system of claim 17, wherein the speed limiter is an electronic speed limiter represented by the instructions stored on the non-transitory memory of the controller onboard the vehicle.

* * * * *